US009316147B2

(12) United States Patent
Wang et al.

(10) Patent No.: US 9,316,147 B2
(45) Date of Patent: Apr. 19, 2016

(54) DETERMINATION OF WASTEGATE VALVE POSITION

(71) Applicant: Ford Global Technologies, LLC, Dearborn, MI (US)

(72) Inventors: Yan Wang, Ann Arbor, MI (US); Hamza Derbas, Boston, MA (US); Vladimir V. Kokotovic, Bloomfield Hills, MI (US); Dimitar Petrov Filev, Novi, MI (US); Eric Luehrsen, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 14/014,156

(22) Filed: Aug. 29, 2013

(65) Prior Publication Data

US 2015/0059338 A1 Mar. 5, 2015

(51) Int. Cl.
| F02D 23/00 | (2006.01) |
| F16K 31/02 | (2006.01) |
| F02B 37/18 | (2006.01) |
| F02D 41/00 | (2006.01) |
| F02D 41/04 | (2006.01) |
| F02D 41/12 | (2006.01) |
| F02D 41/24 | (2006.01) |

(52) U.S. Cl.
CPC ............. *F02B 37/186* (2013.01); *F02B 37/18* (2013.01); *F02D 41/0007* (2013.01); *F02D 41/045* (2013.01); *F02D 41/123* (2013.01); *F02D 41/2464* (2013.01); *F02D 2250/16* (2013.01)

(58) Field of Classification Search
CPC ........ F02B 37/18; F02B 37/186; F16K 39/02; F02D 41/0007; F02D 41/045; F02D 41/123; F02D 41/2464; F02D 2250/16
USPC ........................ 60/602, 611, 605.2, 607–608; 251/129.04
See application file for complete search history.

(56) References Cited

U.S. PATENT DOCUMENTS

| 3,257,796 | A | * | 6/1966 | Updike ........................... 60/602 |
| 3,395,617 | A | * | 8/1968 | Kaptur ..................... 137/625.64 |
| 3,446,473 | A | | 5/1969 | Barker |

(Continued)

FOREIGN PATENT DOCUMENTS

| DE | 19853391 A1 * | 5/2000 | .............. F02B 37/18 |
| DE | 19853392 A1 * | 5/2000 | .............. F02B 37/18 |

(Continued)

OTHER PUBLICATIONS

Li, Yunfeng et al., "Track-Following Control with Active Vibration Damping of a PZT-Actuated Suspension Dual-Stage Servo System," Institute of Electrical and Electronics Engineers, Proceedings of the American Control Conference, Denver, Co., Jun. 4-6, 2003, 18 pages.

(Continued)

*Primary Examiner* — Thai Ba Trieu
(74) *Attorney, Agent, or Firm* — Julia Voutyras; Alleman Hall McCoy Russell & Tuttle LLP

(57) ABSTRACT

Various methods for determining the fully closed position of a wastegate valve are provided. In one example, a non-closed position command for a wastegate valve in a low-lift region relative to a valve seat is received. Prior to executing the position command, the wastegate valve is only temporarily closed to thereby determine a fully closed position.

20 Claims, 9 Drawing Sheets

(56) References Cited

U.S. PATENT DOCUMENTS

| | | | |
|---|---|---|---|
| 3,611,711 A * | 10/1971 | Mueller | 60/600 |
| 4,197,711 A * | 4/1980 | Fuhrmann et al. | 60/602 |
| 4,322,948 A * | 4/1982 | Emmenthal et al. | 60/602 |
| 4,477,875 A * | 10/1984 | Suzuki et al. | 60/602 |
| 4,597,264 A * | 7/1986 | Cipolla | 60/602 |
| 4,694,390 A * | 9/1987 | Lee | 251/129.01 |
| 4,816,987 A * | 3/1989 | Brooks et al. | 251/129.01 |
| 4,892,118 A * | 1/1990 | Davis et al. | 137/625.3 |
| 5,058,537 A | 10/1991 | Paul et al. | |
| 5,386,698 A * | 2/1995 | Kamel | 60/603 |
| 6,147,831 A | 11/2000 | Kennedy et al. | |
| 6,272,401 B1 * | 8/2001 | Boger et al. | 700/282 |
| 6,453,261 B2 * | 9/2002 | Boger et al. | 702/138 |
| 6,554,248 B2 * | 4/2003 | Taniguchi et al. | 251/129.04 |
| 6,614,613 B1 | 9/2003 | Huang et al. | |
| 6,687,601 B2 * | 2/2004 | Bale et al. | 60/602 |
| 6,745,084 B2 * | 6/2004 | Boger et al. | 700/13 |
| 7,111,594 B2 * | 9/2006 | Mizuta et al. | 251/129.04 |
| 7,434,397 B2 | 10/2008 | Hasegawa | |
| 7,562,527 B2 | 7/2009 | Eiraku | |
| 7,775,043 B2 | 8/2010 | Funke et al. | |
| 7,788,922 B2 * | 9/2010 | Muller | 60/602 |
| 8,051,644 B2 | 11/2011 | Gonze et al. | |
| 8,209,979 B2 * | 7/2012 | Wang et al. | 60/602 |
| 8,321,059 B2 * | 11/2012 | Carter et al. | 700/282 |
| 8,347,625 B2 * | 1/2013 | Baeuerle | 60/602 |
| 8,360,394 B2 * | 1/2013 | Xiao | 251/129.04 |
| 8,443,601 B2 * | 5/2013 | Panciroli et al. | 60/602 |
| 8,474,789 B2 * | 7/2013 | Shimada et al. | 251/129.04 |
| 8,485,498 B2 * | 7/2013 | Takeda et al. | 251/129.04 |
| 8,515,647 B2 * | 8/2013 | Panciroli et al. | 60/602 |
| 8,572,961 B2 * | 11/2013 | Karnik et al. | 60/602 |
| 8,579,252 B2 * | 11/2013 | Heer | 251/129.04 |
| 8,814,133 B2 * | 8/2014 | Li et al. | 251/129.04 |
| 2003/0183791 A1 * | 10/2003 | Meinhof | 251/129.04 |
| 2007/0289302 A1 | 12/2007 | Funke et al. | |
| 2007/0293956 A1 * | 12/2007 | Yasui | 700/29 |
| 2010/0011764 A1 | 1/2010 | Andrews | |
| 2010/0176320 A1 * | 7/2010 | Kresse | 251/129.04 |
| 2010/0179699 A1 * | 7/2010 | Kresse | 251/129.04 |
| 2010/0181512 A1 * | 7/2010 | Kresse | 251/129.04 |
| 2010/0181513 A1 * | 7/2010 | Kresse | 251/129.04 |
| 2011/0023481 A1 * | 2/2011 | Baeuerle | 60/602 |
| 2011/0048556 A1 * | 3/2011 | Carter et al. | 137/559 |
| 2012/0001111 A1 | 1/2012 | Takeda et al. | |
| 2012/0198837 A1 * | 8/2012 | Medina | 60/602 |
| 2013/0042476 A1 * | 2/2013 | Carter et al. | 29/890.12 |
| 2013/0189072 A1 | 7/2013 | Wade | |
| 2013/0312406 A1 * | 11/2013 | Landsmann | 60/602 |

FOREIGN PATENT DOCUMENTS

| | | | | |
|---|---|---|---|---|
| DE | 10126596 | A1 * | 12/2001 | F02B 37/18 |
| DE | 102008011613 | A1 * | 9/2009 | F02B 37/18 |
| DE | 102008051817 | A1 * | 4/2010 | F02B 37/18 |
| DE | 102008051818 | A1 * | 4/2010 | F02B 37/18 |
| DE | 102008060343 | A1 * | 6/2010 | F02B 37/18 |
| DE | 102009029880 | A1 * | 12/2010 | F02B 37/18 |
| EP | 46872 | A2 * | 3/1982 | F02B 37/12 |
| EP | 1798394 | A1 * | 6/2007 | F02B 37/18 |
| EP | 2107225 | A1 | 10/2009 | |
| GB | 2319828 | A * | 6/1998 | F02B 37/18 |
| WO | WO 0012883 | A1 * | 3/2000 | F02B 37/18 |

OTHER PUBLICATIONS

Kokotovic, Vladimir V. et al., "Electric Waste Gate Control System Sensor Calibration with End-Stop Detection," U.S. Appl. No. 13/896,257, filed May 16, 2013, 33 pages.

Wang, Yan et al., "Westegate Valve Seat Position Determination," U.S. Appl. No. 14/189,836, filed Feb. 25, 2014, 44 pages.

Luehrsen, Eric et al., "Wastegate Control," U.S. Appl. No. 14/286,702, filed May 23, 2014, 33 pages.

* cited by examiner

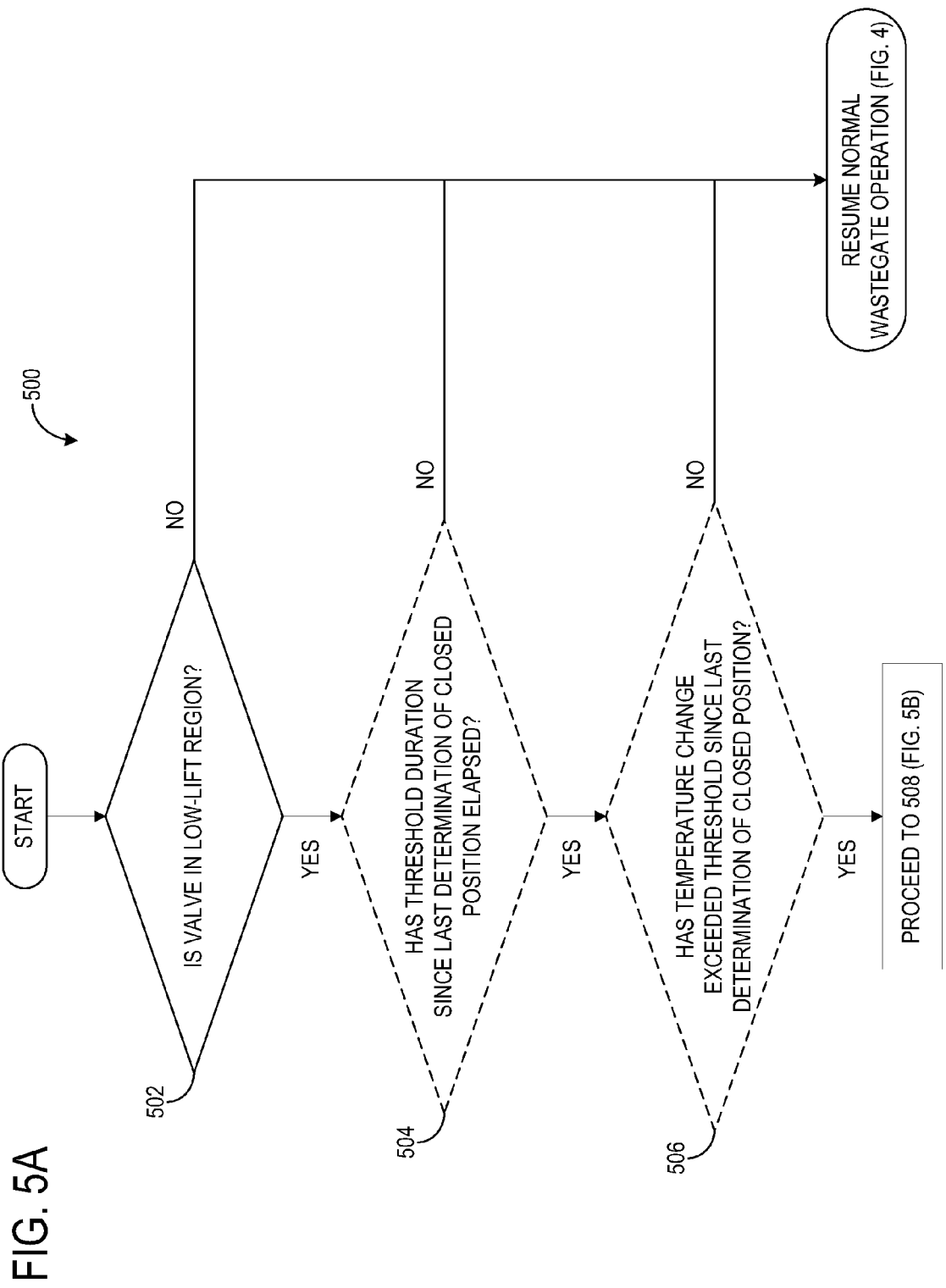

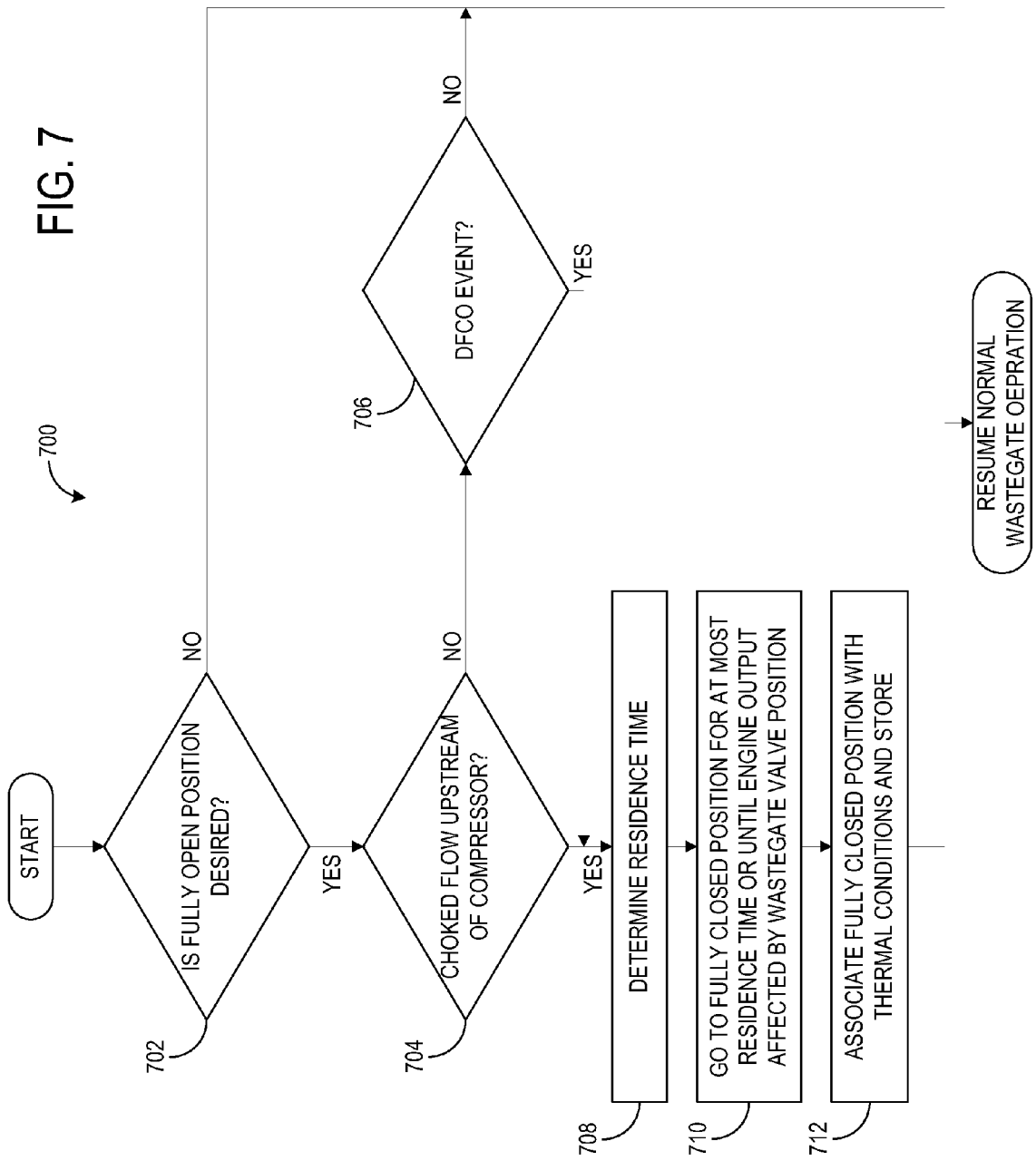

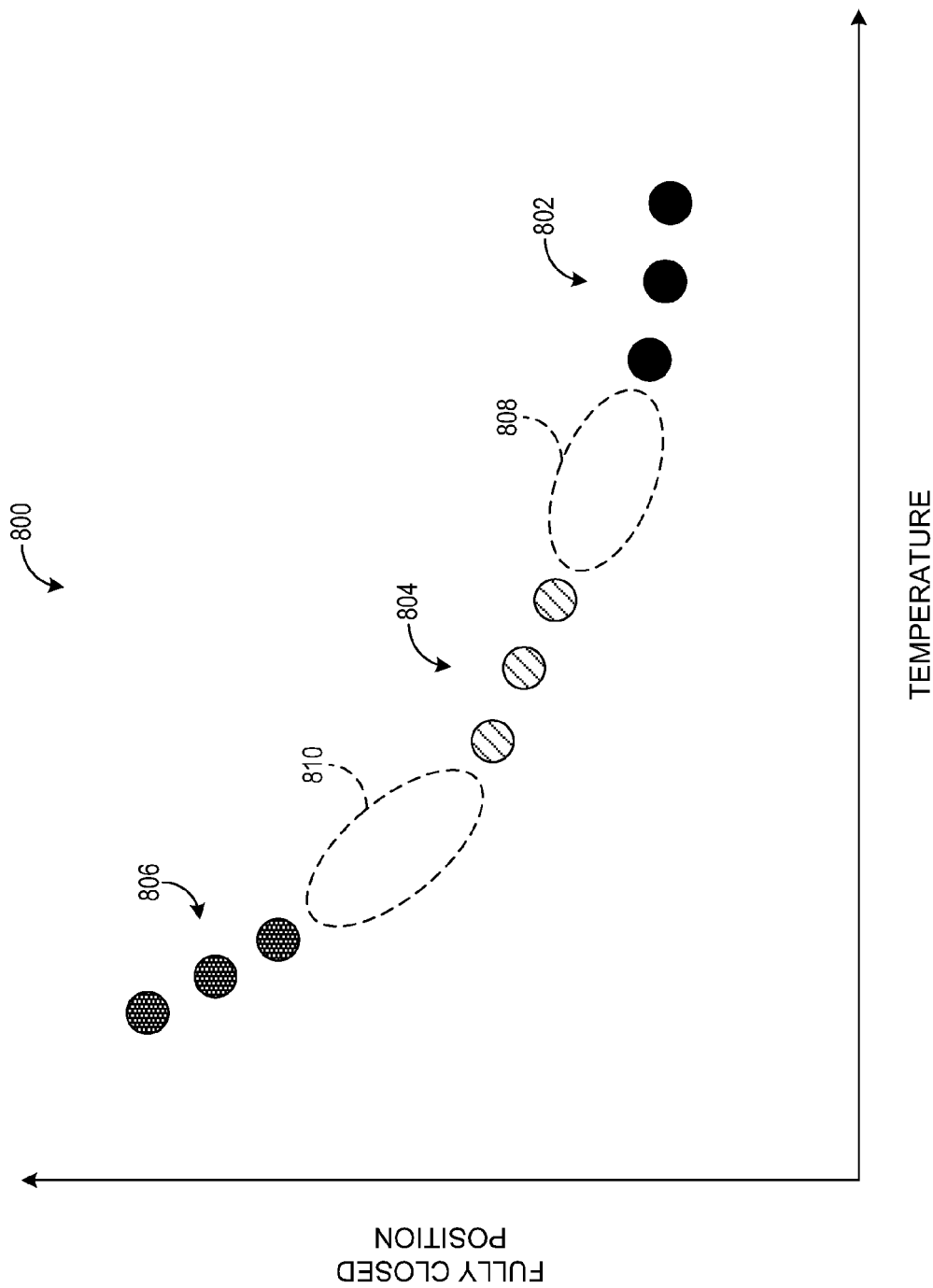

DETERMINATION OF WASTEGATE VALVE POSITION

FIELD

The disclosure relates to a control of a wastegate valve in a turbocharger.

BACKGROUND AND SUMMARY

Some internal combustion engines utilize a compression device such as a turbocharger to increase engine torque/power output density. In one example, a turbocharger may include a compressor connected to a turbine via a drive shaft, where the turbine is coupled to an exhaust manifold side and the compressor is coupled to an intake manifold side of an engine. In this way, the exhaust-driven turbine supplies energy to the compressor to increase the pressure (e.g. boost or boost pressure) in the intake manifold and to increase the flow of air into the engine. The boost may be controlled by adjusting the amount of gas reaching the turbine, for example with a wastegate. A wastegate valve may be controlled based on operating conditions to achieve the desired boost. In some examples, the wastegate valve is actuated pneumatically, while in other examples the wastegate valve is actuated electrically, for example by an electric motor.

U.S. Pat. No. 7,775,043 discloses a system for controlling the boost pressure supplied to an internal combustion engine by adjusting the position of a wastegate valve in a pneumatic wastegate. A wastegate sensor positioned proximate the wastegate valve senses the position of the wastegate valve and delivers a signal representative of the position via a conductor to a controller. The controller receives a plurality of signals including indications of engine speed, boost, and barometric pressure to control the boost pressure supplied to the engine, and accordingly adjusts the position of the wastegate valve by controlling the pressure supplied to a chamber acting against a diaphragm of the wastegate. In the event it is determined that the wastegate valve is not functioning properly, the controller may use signals from the wastegate sensor to re-determine the position of the wastegate valve.

The inventors herein have recognized an issue with such an approach. Portions of the wastegate, such as the wastegate valve and linkage coupling the wastegate valve to the diaphragm (or other actuator in other systems such as an electric motor), encounter high temperatures as the engine heats up and hot exhaust gas is circulated throughout the engine. Due to the exposure of these components to high temperatures, thermal deformation may occur, causing, for example, elongation or contraction in the valve-actuator linkage, and turbine housing deformation. As such, the accuracy of wastegate valve position sensing decreases, as does the knowledge of the location of valve lift with respect to a seat which the wastegate valve contacts at a fully closed position. The degradation of such accuracy may result in the supply of inaccurate levels of boost to the engine.

Methods for determining the fully closed position of a wastegate valve are provided.

In one example, a non-closed position command for a wastegate valve in a low-lift region relative to a valve seat is received. Prior to executing the position command, the wastegate valve is only temporarily closed to thereby determine a fully closed position.

In this way, inaccurate boost supply due to indeterminacy of the fully closed position is avoided. Thus, the technical result of more accurate wastegate control is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 5A and 5B show a flowchart illustrating a method for determining the fully closed position of a wastegate valve of the wastegate of FIG. 2 or 3.

FIG. 7 shows a flowchart illustrating a method for determining the fully closed position of a wastegate valve of the wastegate of FIG. 2 or 3 when a fully open position is desired.

FIG. 8 shows a map of learned fully closed positions as a function of temperature.

DETAILED DESCRIPTION

In some internal combustion engines, a compression device such as a turbocharger is used to increase the pressure (e.g., boost pressure) of air supplied to the engine, thereby increasing engine torque/power output density. In some approaches, a pneumatic wastegate is used to control the position of a wastegate valve and thus the amount of exhaust gas supplied to a turbine of the turbocharger, while in other approaches an electric wastegate is used. In either case, a linkage coupling an actuator to a wastegate valve and a turbine assembly may be subject to high surrounding temperatures and thus thermal deformation (e.g., expansion, contraction, etc.). Thus, determination of the position of the wastegate valve and the position at which it is fully closed against a valve seat may decrease in accuracy, resulting in inaccurate assessment of valve lift and thus supply of boost to the engine.

Figure 1:
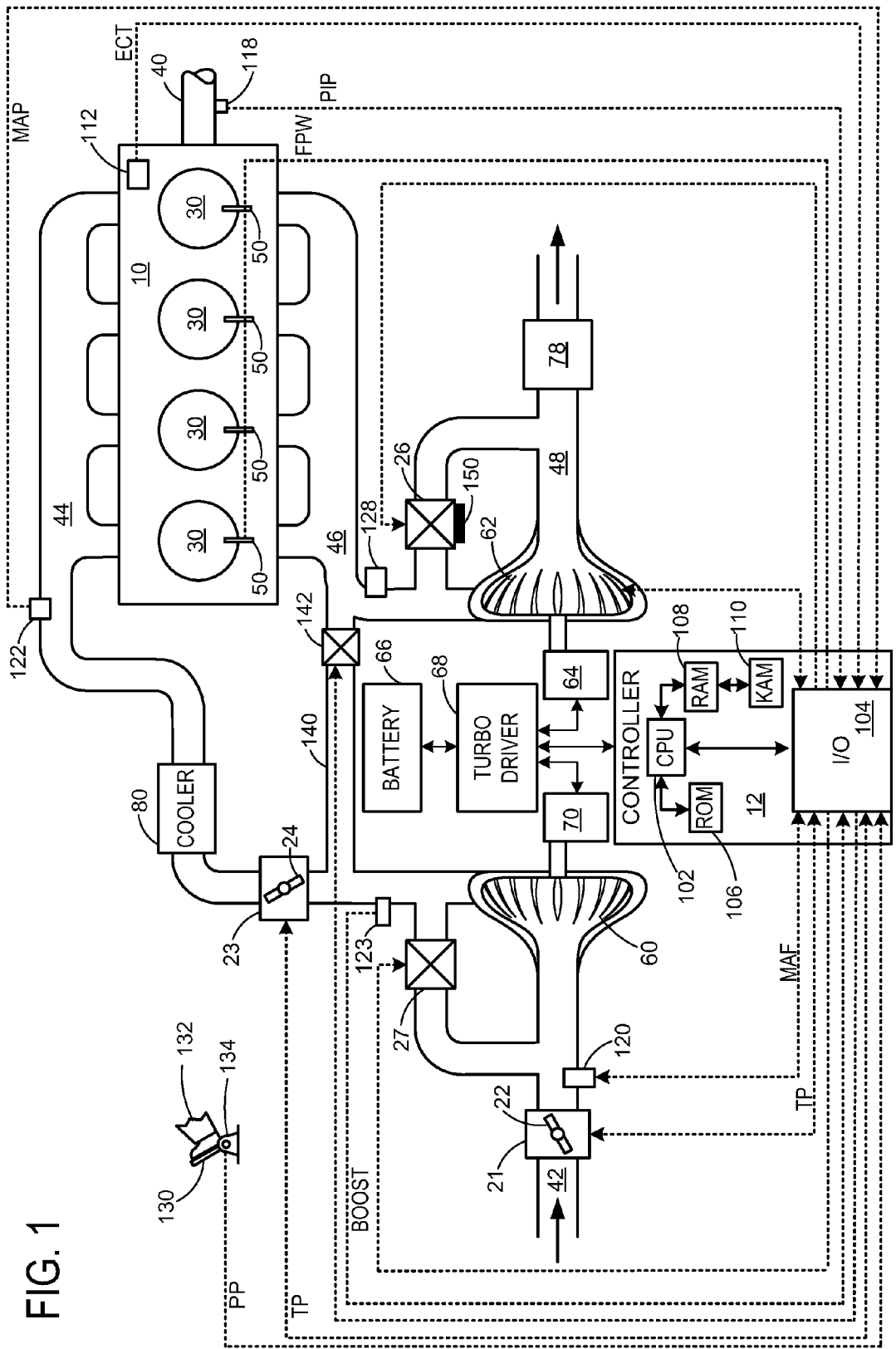
FIG. 1 shows a block diagram of a turbocharged engine including a wastegate.
Figure 2:
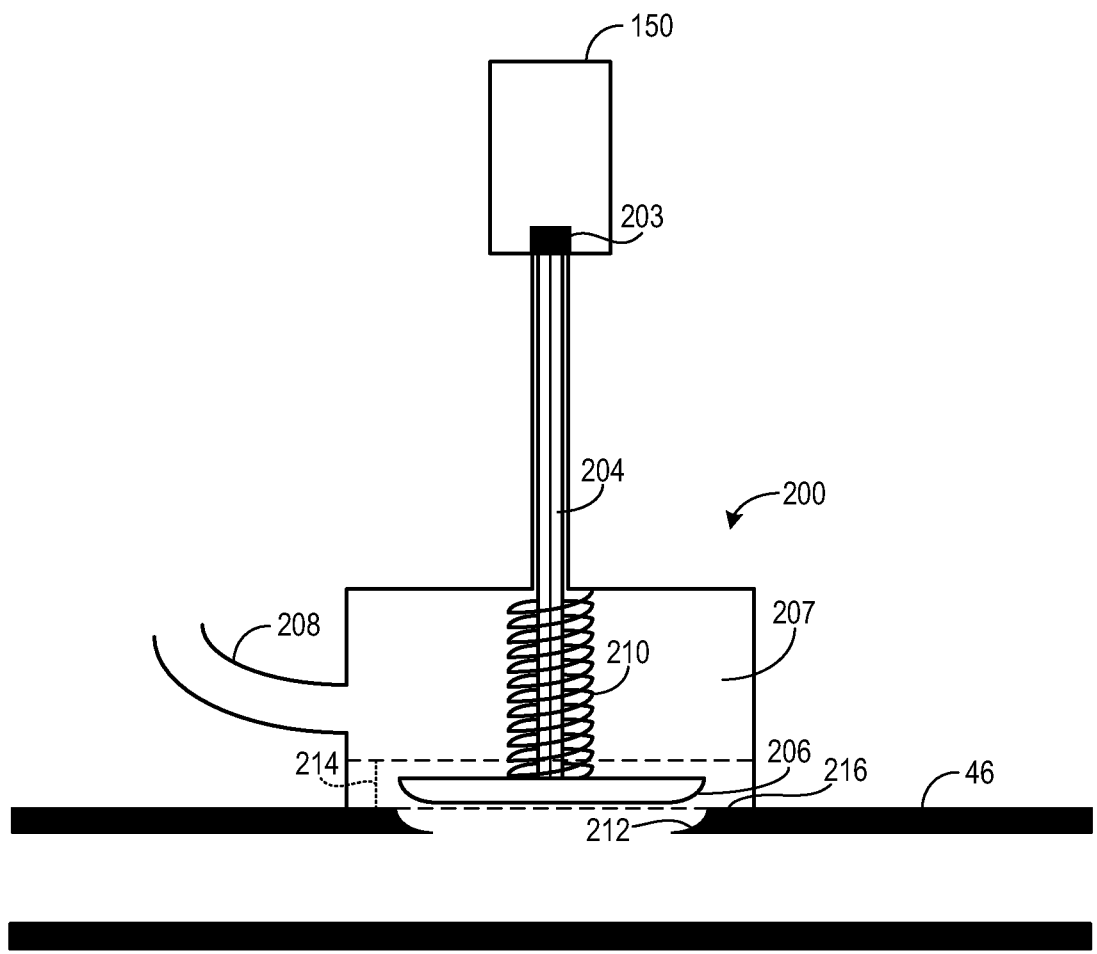
FIG. 2 shows an example of an electric wastegate in accordance with an embodiment of the present disclosure.
Figure 3:
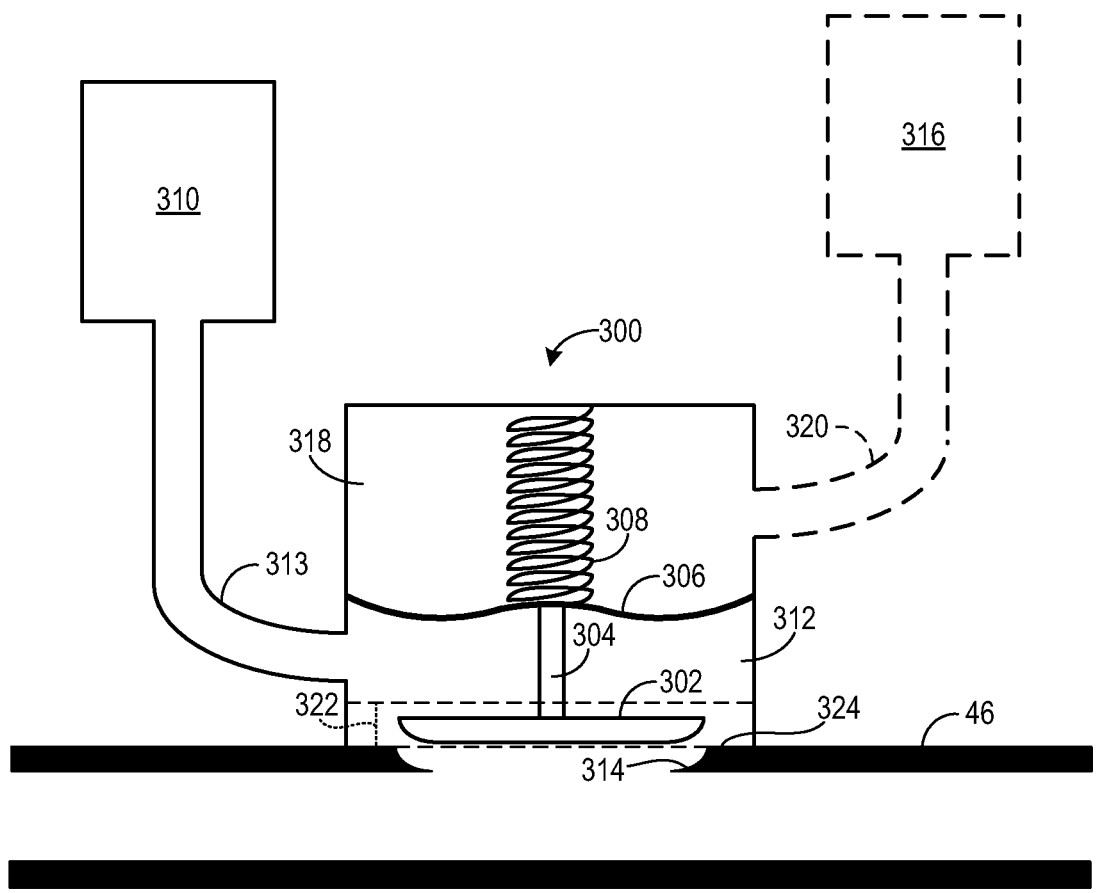
FIG. 3 shows an example of a pneumatic wastegate in accordance with an embodiment of the present disclosure.
Figure 4:
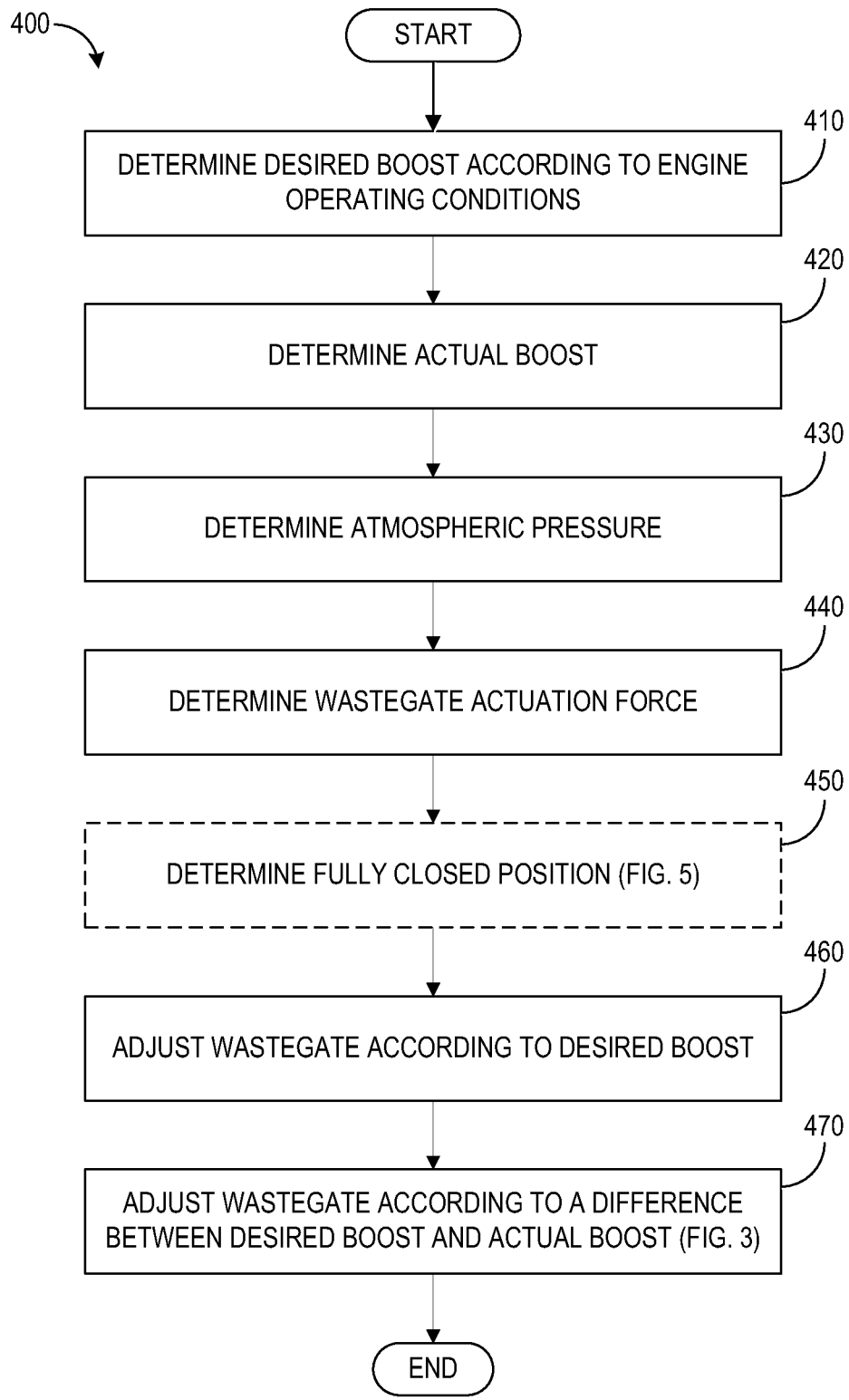
FIG. 4 shows a flowchart illustrating a method for controlling a turbocharger via the wastegate of FIG. 2 or 3.
Figure 5B:
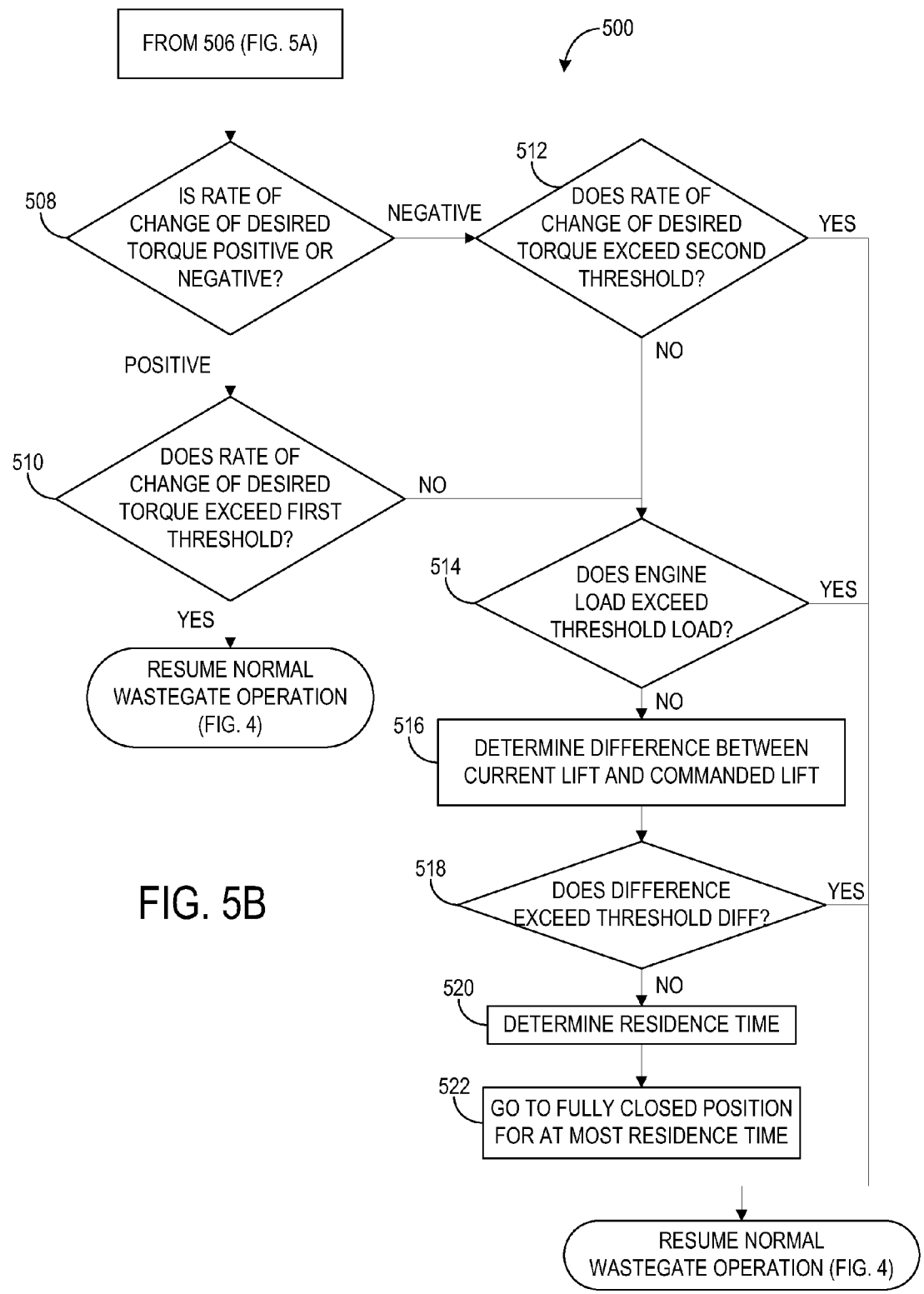
Figure 6:
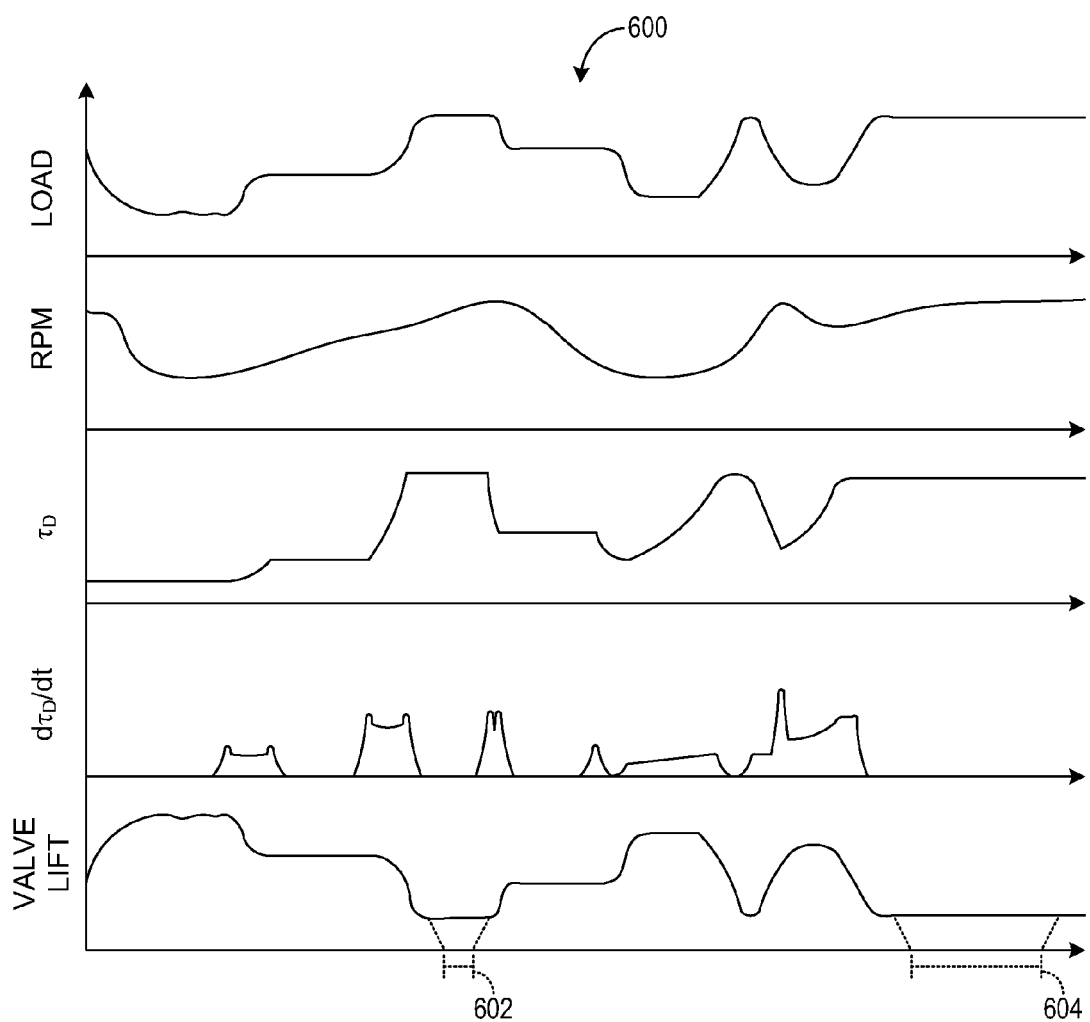
FIG. 6 shows an exemplary map illustrating determination of the fully closed position of a wastegate valve according to various operating parameters of the engine of FIG. 1.

Various methods are provided for determining the fully closed position of a wastegate valve. In one example, a non-closed position command for a wastegate valve in a low-lift region relative to a valve seat is received. Prior to executing the position command, the wastegate valve is only temporarily closed to thereby determine a fully closed position. FIG. 1 is a block diagram of a turbocharged engine including a wastegate. FIG. 2 shows an example of an electric wastegate in accordance with an embodiment of the present disclosure. FIG. 3 shows an example of a pneumatic wastegate in accordance with an embodiment of the present disclosure. FIG. 4 shows a flowchart illustrating a method for controlling a turbocharger via the wastegate of FIG. 2 or 3. FIGS. 5A and 5B show a flowchart illustrating a method for determining the fully closed position of a wastegate valve of the wastegate of FIG. 2 or 3. FIG. 6 shows an exemplary map illustrating determination of the fully closed position of a wastegate valve according to various operating parameters of the engine of FIG. 1. The engine of FIG. 1 also includes a controller configured to carry out the methods depicted in FIGS. 4, 5A, and 5B.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF (mass airflow) and MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric actuator. In some embodiments, actuator 150 may be an electric motor. Additional detail and examples regarding wastegate 26 and actuator 150 will be presented below. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 2, an example of a wastegate 200, which may be wastegate 26 of FIG. 1, is shown. Wastegate 200 is included along a portion of exhaust manifold 46 shown in FIG. 1. In the illustrated embodiment, wastegate 200 is an electric wastegate and is driven by actuator 150, which in this example is an electric actuator, though various suitable devices may be used to drive the wastegate. Actuator 150 transmits a driving force via a linkage 204 (e.g., a cylindrical rod) to a wastegate valve 206, which may transition between a fully closed position and a fully open position, and may settle at any position therebetween. The position of wastegate valve 206 may thus be continuously variable, and may be monitored via a position sensor 203 configured to send signals to an engine controller such as controller 12 of FIG. 1.

As wastegate valve 206 is opened from the fully closed position, an opening may be created through which gasses flowing through exhaust manifold 46 may flow into a chamber 207. From chamber 207, gasses may flow to a vent 208 which may receive and exhaust gas from exhaust manifold 46 when wastegate valve 206 is not in the fully closed position. Thus, the amount of boost supplied to an engine may be controlled by driving wastegate valve 206 via actuator 150, thereby altering the position of wastegate valve 206 and the amount of gas reaching an intake manifold and a turbine of a turbocharger (e.g., turbine 62 in FIG. 1). In one example, the valve 206 may be formed via a pintle, with a surface area facing the flow through manifold 202. The pressure difference across the pintle may generate forces acting to move the pintle. Although not shown, wastegate 200 may include a motor and a gear box, with linkage 204 extending from an output shaft of the gear box to wastegate valve 206. In some embodiments position sensor 203 may measure the orientation of such components, such as the translational position of linkage 204, the rotational orientation of the output shaft or another component inside the motor. In this example, such measurements may be used to indirectly determine the position of wastegate valve 206. Moreover, in other embodiments the position of wastegate valve may be determined based on a soft model using one or more of the signals (e.g., BOOST) described above with reference to FIG. 1 and sent to controller 12.

Wastegate 200 may further include a bias 210. Bias 210 is attached at one end to wastegate 200 and to wastegate valve 206 at the other end. In some embodiments, bias 210 is selected to supply a closing force which maintains wastegate valve 206 in a fully closed position up to a threshold pressure. As one non-limiting example, bias 210 may be selected to allow wastegate valve 206 to open for a mean pressure difference across the turbocharger turbine between 0.75 bar and 1 bar. In the event of wastegate degradation, for example due to a loss of power to actuator 150, wastegate valve 206 may be maintained in a fully closed position up to a threshold pressure via the spring pre-load, ensuring that a sufficient buildup of boost is delivered to the engine. Such a configuration may be particularly advantageous in downsized engines, as the extent of downsizing need not be limited to account for the possibility of wastegate actuator degradation. Conversely, at or above the threshold pressure, bias 210 may allow wastegate valve 206 to move toward a fully open position, limiting maximum boost, especially at high loads. Moreover, the size of a wastegate actuator (e.g., actuator 150) and its power consumption may be reduced, as bias 210 supplies additional closing force to wastegate 26. Therefore, during non-degraded operation, the actuator may hold the valve in the fully closed position with a current level that is lower than if the spring pre-load was zero. The current supplied to actuator 150 may be selected to account for the closing force of a bias, such as the spring. In the illustrated embodiment, bias 210 is shown as a spring in a precompressed state, though various suitable structures may be used to supply additional closing force to wastegate 26. In the case where a spring is employed, the spring constant may be selected to supply closing force up to a particular threshold pressure and supply sufficient boost to an engine.

At the fully closed position, wastegate valve 206 comes into contact with a valve seat 212, abutting the valve seat and fluidically sealing wastegate 200 from exhaust passage 46 such that gasses flowing through the exhaust passage do not enter the wastegate. At this position, maximum boost may be provided to engine 10, depending on other conditions such as the positions of throttles 21 and 23 of FIG. 1. FIG. 2 also depicts a low-lift region 214 designating a region in which the separation between wastegate valve 206 and valve seat 212 is considered to be relatively small for the plurality of positions (e.g., lifts) of the wastegate valve in this low-lift region. In one example, the low-lift region may be a lower 25% of the total lift available. In another example, it may be a range of 0-30% of the total lift available. As used herein, "lift" may equally refer to the position of a wastegate valve relative to fully closed. In another example, low-lift region 214 may extend from an upper surface 216 of valve seat 212 to any suitably defined point within chamber 207, and may be measured from this upper surface to the upper surface of wastegate valve 206.

For example, low-lift region 214 may extend from upper surface 216 of valve seat 212 to a height approximately 20% of the total height of chamber 207. It will be understood, however, that suitable low-lift regions may be predetermined based on the physical characteristics of a wastegate or dynamically determined based on various operating parameters. Low-lift region 214 is referenced in a method 500 described below with reference to FIG. 5 to increase the accuracy of boost control.

Turning now to FIG. 3, another example of a wastegate 300 is shown, which may be wastegate 26 of FIG. 1. As with electric wastegate 200 shown in FIG. 2, wastegate 300 is included along a portion of exhaust manifold 46 shown in FIG. 1, and includes a wastegate valve 302 coupled to a linkage 304 (e.g., cylindrical rod). Wastegate 300, however, is a pneumatic wastegate controlled via pressurized fluid. As such, linkage 304 is coupled to a diaphragm 306 which is in turn coupled to a bias 308, which may be bias 210 of FIG. 2 or any other suitable bias. Bias 308 may bias wastegate valve 302 and diaphragm 306 to any suitable position—e.g., at a fully closed position, a fully open position, or anywhere therebetween.

To facilitate pneumatic positioning of wastegate valve 302, a pressurized fluid source 310 provides varying levels of pressurized fluid (e.g., pressurized air) to a first chamber 312 of wastegate 300 via a first duct 313. Pressurized fluid entering first chamber 312 acts against diaphragm 306, adjusting the position of diaphragm 306 and thus wastegate valve 302 with sufficient pressures. When wastegate valve 302 is in a fully closed position (e.g., fully abutted against a valve seat 314 and fluidically sealing gasses flowing through exhaust manifold 46 from first chamber 312), pressurized fluid delivered from pressurized fluid source 310 to the first chamber provides the mechanism by which wastegate valve 302 may begin to open. At other partially open positions, however, pressurized fluid delivered from pressurized fluid source 310 may combine with exhaust gasses entering first chamber 312 from exhaust manifold 46 to position wastegate valve 302. Pressurized fluid source 310 may be, for example, an air compressor or a source of intake air from engine 10 of FIG. 1. Although not shown, pressurized fluid source 310 may include a vacuum regulator and/or one or more valves to control the supply of pressurized fluid to first chamber 312. Likewise, wastegate 300 may optionally include a second pressurized fluid source 316 configured to provide pressurized fluid (e.g., pressurized air) to a second chamber 318 in wastegate 300 via a second duct 320. Pressurized fluid delivered from this source to second chamber 318 may act against diaphragm 306 in a direction opposite that of fluid delivered to first chamber 312. With the inclusion of a vacuum regulator and/or one or more valves in second pressurized fluid source 316 and/or second duct 320, precise positioning of wastegate valve 302 may be achieved via balanced supply of pressurized fluid to both first and second chambers 312 and 318. It will be appreciated that suitable modifications may be made to wastegate 300 without departing from the scope of the disclosure. For example, a vent (not shown) may be provided to further aid in pressure regulation in the wastegate. Further, a position sensor (not shown) may be provided in wastegate 300 to facilitate determination of the position of wastegate valve 302 as with position sensor 203 in wastegate 200.

FIG. 3 also shows a low-lift region 322 in which the separation between wastegate valve 302 and valve seat 314 is considered to be relatively small for the plurality of positions (e.g., lifts) of the wastegate valve in this low-lift region. As with low-lift region 214 shown in FIG. 2, low-lift region 322 may extend from an upper surface 324 of valve seat 314 to any suitably defined point within first chamber 312, and may be measured from this upper surface to the upper surface of wastegate valve 302. As a non-limiting example, low-lift region 322 may extend from upper surface 324 of valve seat 314 to a height approximately 15% of the sum height of first and second chambers 312 and 318. Low-lift region 322 may be defined as any suitable portion of the sum height of first and second chambers 312 and 318, and may be predetermined based on the physical characteristics of wastegate 300 or determined dynamically based on various desired operating parameters.

FIG. 4 shows a flowchart illustrating a method 400 which may be executed by an engine controller (e.g., controller 12) for controlling a turbocharger via a wastegate (e.g., wastegates 200 and 300). In one example, a method of controlling a turbocharger of an engine via a wastegate may comprise determining a desired boost pressure and an actual boost pressure. The wastegate may be adjusted according to a difference between the desired boost pressure and the actual boost pressure.

At 410 the method includes determining a desired boost according to engine operating conditions. The conditions assessed may be directly measured with sensors, such as sensors 112, 118, 120, 122, 123, and 134 for example, and/or the conditions may be estimated from other engine operating conditions. The assessed conditions may include engine coolant temperature, engine oil temperature, mass airflow (MAF), manifold pressure (MAP), boost (for example, BOOST pressure from sensor 123), engine speed, idle speed, barometric pressure, a driver-demanded torque (for example, from a pedal position sensor 134), air temperature, vehicle speed, etc.

Next, at 420, an actual boost pressure may be determined. The actual boost may be directly measured from a sensor, such as sensor 123. The measurement may be sent to controller 12 via the BOOST pressure signal and stored in a computer readable storage medium. In an alternative embodiment, the actual boost pressure may be estimated based on other operating parameters, such as based on MAP and RPM, for example.

Next, at 430, atmospheric pressure may be determined. For example, atmospheric pressure may be measured from the MAP sensor at engine start-up, and/or estimated based on operating conditions of the engine, including MAF, MAP, throttle position, etc. The measurement may be sent to controller 12 and stored in a computer readable storage medium. In an alternative embodiment, the atmospheric pressure may be estimated based on other operating parameters.

Next, at 440, a wastegate actuation force may be calculated based on a pressure differential across the wastegate, exhaust flow, and/or the angle of the wastegate valve. The wastegate may be adjusted according to the wastegate actuation force. The wastegate actuation force may accurately resemble a pressure differential across the wastegate. For example, the wastegate actuation force may be used as an input to wastegate dynamics. The wastegate dynamics may map a desired wastegate pressure or a desired wastegate valve position to a wastegate duty cycle for a given wastegate actuation force, where the duty cycle signal is generated by the controller and sent to the wastegate actuator to adjust the actuation force. The wastegate actuator may be actuator 150 in wastegate 200, or a vacuum regulator in wastegate 300, for example. Mapping to a wastegate duty cycle may include using lookup tables or calculating the wastegate duty cycle. A wastegate control (WGC) signal may include pulse width modulation via the wastegate duty cycle to adjust the wastegate. The desired wastegate pressure or the desired wastegate valve position may be achieved by feed-forward, feedback, or other control algorithms, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

Next, at 450, the position at which the wastegate valve (e.g., valves 206, 302) is fully closed is optionally determined. FIGS. 5A and 5B show a flowchart illustrating a method 500 for determining the position at which a wastegate valve is fully closed. Method 500 may be used to determine the position at which wastegate valves 206 302 are fully closed, for example.

Utilization of method 500 is based on the recognition that thermal deformation in a wastegate due to high surrounding temperatures adversely affects control of the wastegate and thus accurate supply of boost levels to an engine. In an electric wastegate such as wastegate 200, thermal deformation may cause linkage 204 to expand and contract, introducing an error between a determined and actual position of wastegate valve 206. Likewise, with a pneumatic wastegate such as wastegate 300, thermal deformation in linkage 304 may introduce an error between the determined and actual position of wastegate valve 302. The inventors herein have recognized that when a wastegate valve is placed within a certain distance away from its corresponding valve seat (e.g., within a low-lift region such as low-lift region 214), and under certain conditions described in more detail below, the wastegate valve may be moved for a brief, predetermined time period to a fully closed position without adversely affecting (e.g., overshooting/undershooting) engine output or risking the engine and other components in order to determine the location (or orientation/state of another component) of the fully closed position when desired.

At 502 of the method, it is determined whether or not the wastegate valve is in a low-lift region. As described above, the low-lift region may designate a region in which the separation between the wastegate valve and its corresponding valve seat (e.g., valve seat 314) is relatively small for the plurality of positions (e.g., lifts) of the wastegate valve in this low-lift region. For example, the low-lift region may be 20% of the overall height of a chamber in which the wastegate valve moves. In some embodiments, the low-lift region may be a region may include positions greater than a lower threshold but smaller than an upper threshold (e.g., between 10-20% of maximum lift). The low-lift region may be predetermined based on the physical characteristics of a wastegate and engine, or may be determined dynamically such that the maximum lift from which the wastegate valve may be moved to the fully closed position is possible without adversely affecting engine output. A position sensor (e.g., position sensor 203) corresponding to the wastegate may be used to determined whether the wastegate valve is in the low-lift region, if available. If it is determined that the wastegate valve is not in the low-lift region (NO), normal wastegate operation is resumed by returning to 460 of method 400. If the wastegate valve is in the low-lift region (YES), the method proceeds to 504.

Next, at 504, it is optionally determined whether a threshold duration has elapsed since the previous determination of the fully closed position. Here, inaccurate boost control due to thermal deformation is mitigated by attempting to periodically determine the fully closed position. The threshold duration may be predetermined based on average temperature changes for average driving cycles, or may be dynamically determined based on various operating parameters—for example, by tracking temperature changes throughout engine operation. If the threshold duration has not elapsed since the previous determination of the fully closed position (NO), normal wastegate operation is resumed by returning to 460 of method 400. If the threshold duration has elapsed (YES), the method proceeds to 506.

Next, at 506, it is optionally determined whether a temperature change has exceeded a threshold since the last determination of the fully closed position. The threshold may be predetermined based on known thermal expansion coefficients (e.g., corresponding to the wastegate valve linkage) such that temperature changes exceeding the threshold prompt redetermination of the fully closed position, as a significant amount of thermal deformation has likely occurred. If the temperature change has not exceeded the threshold since the last determination of the fully closed position (NO), normal wastegate operation is resumed by returning to 460 of method 400. If the temperature change has exceeded the threshold since the last determination of the fully closed position (YES), the method proceeds to 508.

Turning to FIG. 5B, at 508, it is determined whether the rate of change of desired torque is positive or negative. If the rate of change of desired torque is positive, the method proceeds to 510. In this case, a greater level of boost may be supplied to the engine, in which case commands will be issued to the wastegate to move the wastegate valve toward the fully closed position. As, in this example, the wastegate valve will already be moving toward the fully closed position, operating conditions may be more amenable to going to the fully closed position. As such, the method handles positive rates of change of desired torque different than negative rates of change of desired torque, and gives preference to the former over the latter.

Next, at 510, having determined that the rate of change of desired torque is positive, it is determined whether the positive rate of change of desired torque exceeds a first threshold. If the positive rate of change of desired torque exceeds the first threshold (YES), normal wastegate operation is resumed by returning to 460 of method 400. Here, scenarios in which driver torque demand prohibitive to determination of the fully closed position do not prompt such determination. If instead the positive rate of change of desired torque does not exceed the first threshold (NO), the method proceeds to 514.

At 512, having determined that the rate of change of desired torque is negative, it is determined whether the negative rate of change of desired torque exceeds a second threshold. In contrast to the scenario described above in which the rate of change of desired torque is positive, here commands will be issued to the wastegate to move the wastegate valve away from the fully closed position. As such, negative rates of change of desired torque may be less conducive to determining the fully closed position as less time is available for a detour from normal wastegate valve operation. Thus, the second threshold may be less than the first threshold, with a greater range of positive rates of change of desired torque conducive to determination of the fully closed position compared to the range of negative rates of change of desired torque which are conducive to such determination. If the second threshold is exceeded (YES), normal wastegate operation is resumed by returning to 460 of method 400. If the second threshold is not exceeded (NO), the method proceeds to 514.

In some cases, the rate of change of desired torque may be substantially equal to zero. Here, at least a portion of the history of the rate of change of desired torque may be evaluated to determine a net positive or negative rate of change of desired torque. Other approaches may predict the rate of change of desired torque. In some embodiments, the method may simply proceed to 514 upon determination of a rate of change of desired torque substantially equal to zero.

Next, at 514, it is determined whether the load of the engine (e.g., engine 10) exceeds a threshold load. If the threshold load is exceeded (YES), normal wastegate operation is resumed by returning to 460 of method 400. Here, situations for which the time required to move the wastegate valve to the fully closed position is prohibitive may be avoided, as are situations in which further closing of the wastegate valve would present risk to the engine and its components. In other embodiments, it may be determined whether an engine revolution rate (e.g., in terms of RPM) exceeds a threshold rate. If the threshold load is not exceeded (NO), the method proceeds to 516.

At 516, the difference between the current lift of the wastegate valve and a commanded lift sent to the wastegate from a controller (e.g., controller 12 in FIG. 1) is determined. As a commanded lift sent from a controller may be encoded in terms of a parameter associated with an actuator of the wastegate valve, the commanded lift may be translated to a wastegate valve position, for example via a look-up table. While in some scenarios the wastegate valve may be in the low-lift region, a commanded lift may be issued to the wastegate valve which corresponds to a lift significantly separated from its current lift. Such separation may be prohibitive for moving the wastegate valve to the fully closed position in the time available to do so and subsequently reach the commanded lift. Thus, at 518, it is determined whether the difference between the current lift and the commanded lift exceeds a threshold difference. If the threshold difference is exceeded (YES), normal wastegate operation is resumed by returning to 460 of method 400. If the threshold difference is not exceeded (NO), the method proceeds to 520.

At 520, a residence time for which the wastegate valve may be maintained at the fully closed position is determined. The residence may be determined based at least on the current wastegate valve lift and the commanded lift determined at 516, and physical characteristics of the wastegate. The residence time may be selected such that engine output (e.g., torque) and turbine speed are not overshot. Residence time selection in this way may take into account one or more operating parameters including a rate of change of desired engine torque, as described in further detail below. For example, the residence time may decrease as the rate of change of desired torque increases. As another example, the residence time may be determined based on a difference between a position command and the current wastegate valve lift.

Next, at 522, the wastegate valve is moved to the fully closed position for a duration of at most the residence time determined at 520. For certain scenarios, sufficient determination of the fully closed position may require going to the fully closed position for a significant portion, or the entirety of, the residence time. For example, the wastegate valve may bounce off its valve seat after being instructed to go to the fully closed position. As such, more time is needed to ensure contact of the valve seat and thus determination of its location. It will be appreciated that verification that the fully closed position has been reached may be performed in any suitable way, including monitoring actuator feedback (e.g., current supplied to a motor in an electric wastegate), feedback from a wastegate valve position sensor, and boost levels. Here, a current fully closed position may be determined, as the current fully closed position may be different from a fully closed position determined at a prior time. Moreover, other data may be associated with a learned fully closed position, including one or more thermal conditions (e.g., exhaust gas temperature) and the time at which the fully closed position is learned. The collective data may be stored in a suitable data structure in controller 12 to provide an indication of the thoroughness of fully closed position learning, as described in further detail below with reference to FIG. 8.

In this way, method 500 provides a mechanism by which inaccurate boost control due to indeterminacy of a wastegate valve position resulting from thermal deformation may be mitigated without adversely affecting engine output (e.g., torque) or endangering normal operation. In embodiments which utilize inner and outer loop control to control boost levels supplied by a wastegate, the relatively fast dynamics of the inner loop control may be leveraged to determine the location of a fully closed position (e.g., valve seat) without adverse effects. As described above, it will be understood that determination of the location of the fully closed position may correspond to an orientation or state of an actuator operatively coupled to a wastegate, such as the orientation of a rotating component in a motor actuating an electric wastegate. Further, method 500 may be adjusted in various suitable ways to achieve the outcomes described above. For example, the method may be executed without recent supply of a commanded lift by an engine controller, but upon exceeding one or more of the thresholds described above (e.g., time, temperature, etc.).

Method 500 may include additional steps not shown. Particularly, the method may indicate degradation of wastegate valve position sensing. If an actual position of a wastegate valve (e.g., indicated by a position sensor) disagrees with a learned fully closed position by greater than a degradation threshold for greater than the duration of a residence time at which the wastegate valve is maintained at the fully closed position, degradation may be indicated, for example via a dashboard indicator and/or setting a diagnostic code.

Turning now to FIG. 6, a map 600 is shown, illustrating an engine load, revolutions per minute (RPM), desired torque ($\tau_D$), rate of change of desired torque ($d\tau_D/dt$), and lift of a wastegate valve, all as functions of time. Map 600 may illustrate an exemplary drive cycle for engine 10 in embodiments for which the engine includes wastegate 200 or 300 and executes method 500 of FIG. 5, for example.

FIG. 6 particularly illustrates times and operating parameter regions in which, per execution of method 500 of FIG. 5, a wastegate valve is moved to its fully closed position to thereby determine the location of the fully closed position. At a first region 602, operating parameters are conducive to determination of the fully closed position. In particular, the load, RPM, desired torque, and rate of change of desired torque are within acceptable limits for such determination. Accordingly, as shown by the dashed lines, the lift of the wastegate valve is reduced to zero (e.g., brought against its valve seat to the fully closed position) for a first residence time. Conditions, such as a command to increase the lift of the wastegate valve, end determination of the fully closed position. Similarly, later in the operation of engine 10, operating parameters are conducive to redetermination of the fully closed position at a second region 604. Here, the time separating determination of the fully closed position at the first region 602 and the second region 604 exceeds a threshold prompting redetermination. In addition, operating parameters remain conducive to maintaining the wastegate valve at the fully closed position for a second residence time which is relatively longer than the first residence time. Exit from determination of the fully closed position is also illustrated. While operating parameters may not necessitate such exit, the second residence time is adequate for sufficient determination of the fully closed position. At other regions of map 600, operating parameters prevent determination of the fully closed position. For example, at regions prior to first region 602, and between first and second regions 602 and 604, the valve lift cannot be reduced to zero, for example due to large valve lifts and high desired torque. At a region 606, the rate of change of desired torque ($d\tau_D/dt$) exceeds an upper limit, preventing application of the fully closed state. In some embodiments, as this rate of change increases, the duration of the residence time at which a wastegate valve is maintained at a fully closed state decreases. Positioning a wastegate valve at a fully closed state, and determining a residence time to maintain the wastegate valve at the fully closed state, may take into account one or more of the operating parameters described above (e.g., rate of change of desired engine torque).

Returning to FIG. 4, at 460 the wastegate may be adjusted according to the desired boost, taking into account adjustments made at 450 if the fully closed position was determined. In some examples, the desired boost pressure may be used as an input to a feed-forward control algorithm for adjusting the wastegate position. The feed-forward control algorithm may process a target wastegate pressure or a target wastegate valve position that may be used as an input to inner control loops.

Finally, at 470, a boost error may be calculated as a difference between the desired boost pressure and the actual boost pressure. The wastegate may be adjusted according to the processed boost pressure error. For example, the boost pressure error may be used as an input to a feedback control algorithm to calculate a target wastegate pressure, if pressure control is desired, or a target wastegate valve position within an inner loop. The control algorithm may include a compensation term as described above.

Determination of the fully closed position of a wastegate valve may be performed for other operating conditions including those in which placement of the wastegate valve in a fully open position is desired. FIG. 7 shows a flowchart illustrating a method 700 for determining the fully closed position of a wastegate valve (e.g., wastegate valves 206, 302) when the fully open position is desired. Wastegate valves 206 and 302 may occupy fully open positions when placed respectively in regions above and outside of low-lift regions 214 and 322, for example. Method 400 of FIG. 4 may be modified to include method 700 alternatively or in addition to method 500 of FIG. 5.

At 702 of method 700, it is determined whether the fully open position of a wastegate valve is desired. A commanded lift sent by an engine controller (e.g., controller 12 of FIG. 1) may be evaluated to perform such determination. If the commanded lift corresponds to the fully open position, it is determined that the fully open position is desired (YES), and the method proceeds to 704. If the fully open position is not desired (NO), normal wastegate operation resumes, for example by returning to 460 of method 400.

At 704, it is determined whether fluid flow (e.g., flow of intake air) upstream of a turbocharger compressor (e.g., compressor 60) is choked. Fluid flow upstream of the turbocharger compressor may be evaluated based on signals provided by a mass air flow sensor, such as sensor 120 in FIG. 1, for example. If fluid flow is choked in this region, movement of the wastegate valve toward the fully closed position will not increase boost levels supplied to an engine (e.g., engine 10) or resulting engine output/torque. As such, if fluid flow is choked upstream of the compressor (YES), method 700 proceeds to 708. If fluid flow is not choked upstream of the compressor (NO), the method proceeds to 706.

At 706, it is determined whether a deceleration fuel cut off (DFCO) event is occurring. Evaluation of current fueling conditions may include monitoring FPW signals issued by controller 12 in FIG. 1, for example. Here, conditions such as vehicle deceleration prompt termination of fuel supply to the cylinders of an engine (e.g., cylinders 30 of engine 10 in FIG. 1). In this case, increases in the boost level supplied to the engine will not result in increases in engine output/torque. As such, the wastegate valve may be moved to the fully closed position without adversely affecting engine operation (e.g., overshooting engine torque). Accordingly, if it is determined that a DFCO event is occurring (YES), the method proceeds to 708. If a DFCO event is not occurring (NO), normal wastegate operation resumes, for example by returning to 460 of method 400.

At 708, a residence time at which the wastegate valve may be maintained in order to learn the fully closed position is determined, as described above.

Next, at 710, the wastegate valve is moved to and maintained at the fully closed position for at most the residence time, as described above, or until the position of the wastegate valve affects engine output, which in the illustrated embodiment occurs when the DFCO event ends or when fluid flow is no longer choked upstream of the compressor of the turbocharger. Thus, in some scenarios, the wastegate valve is maintained at the fully closed position for less than the determined residence time.

Finally, at 712, the fully closed position learned at 710 is associated with one or more thermal conditions and stored, for example in RAM 108 and/or KAM 110 of controller 12 in FIG. 1. The one or more thermal conditions may include a reading from a temperature sensor such as sensor 112 of engine 10, though readings from other sensors may be included as well as estimations of temperature proximate the wastegate valve (e.g., exhaust gas temperature). The time at which a fully closed position is learned may further be associated with the learned fully closed position and the associated one or more thermal conditions such that an indication of the frequency of fully closed position learning for particular thermal conditions may be provided, as described in further detail below. Following 712, normal wastegate operation resumes, for example by returning to 460 of method 400.

Turning now to FIG. 8, a map 800 is which may be formed based on a plurality of learned fully closed positions and associated data including one or more thermal conditions, which in this example includes a temperature (e.g., exhaust gas temperature), and the time at which the fully closed positions are learned, illustrated in this example by shading. In particular, map 800 includes a first group 802 of positions learned relatively recently for a relatively high range of temperatures, a second group 804 of positions learned prior to first group 802 toward a middle range of temperatures, and a third group 806 of positions learned prior to second group 804 toward the beginning of engine operation in a relatively low range of temperatures. Map 800 provides a structure suitable for storage of both current learned fully closed positions and historical fully closed positions (e.g., fully closed positions learned prior to a current learned fully closed position). Map 800 may also provide an indication of the frequency of fully closed position learning. For example, regions in which fully closed positions learning has not occurred or has occurred infrequently may be determined by accessing map 800. In the illustrated example, no fully closed position learning has occurred in regions 808 and 810. To maximize fully closed position learning and ensure learning is carried out substantially throughout a range of engine operation regions (e.g., temperatures), an engine controller (e.g., controller 12) may include instructions executable to preferentially schedule fully closed position learning for regions in which no or infrequent learning has occurred, such as regions 808 and 810. Fully closed position learning for a particular region may be prompted if a threshold duration since previous learning is exceeded, for example.

Moreover, fully closed position learning may be carried out based on the time since learning last occurred. As third group 806 of positions marks the oldest learning in map 800, priority may be given to fully closed position relearning in this region. In some approaches, regions 808 and 810 may be filled based on proximate learned positions. For example, these regions may be filled by extrapolating positions learned in other surrounding regions (e.g., region 808 may be filled by extrapolating learned positions in groups 802 and 804). It will be appreciated, however, that the described functionality of map 800 may be facilitated by other suitable data structures. For example, a look-up table may encode learned positions associated data including time of learning and temperature.

Note that the example control and estimation methods included herein can be used with various engine and/or vehicle system configurations. The specific methods described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a turbocharger wastegate valve of an internal combustion engine, comprising:
receiving data from one or more sensors via a controller; commanding receiving a non-closed position command for the turbocharger wastegate valve via the controller; and
prior to executing the position command in response to any one of a fluid flow upstream of a compressor of the turbocharger, fuel, a temperature and a time associated with the current fully closed position, a rate of change of desired torque, an engine revolution rate and an engine load, and a threshold duration and a threshold change in temperature, and a residence time, only temporarily closing the turbocharger wastegate valve to determine a current fully closed position via the controller.

2. The method of claim 1, further comprising:
adjusting an actuator coupled to the turbocharger wastegate valve via the controller based on the determined current fully closed position while at least partially open,
wherein determining the current fully closed position includes determining an orientation of the actuator operatively coupled to the turbocharger wastegate valve.

3. The method of claim 2, wherein the actuator is one of a pneumatic actuator and an electric actuator, and the method further comprising after only temporarily closing the turbocharger wastegate valve, adjusting the actuator to move the turbocharger wastegate valve to the non-closed position commanded based on the determined current fully closed position via the controller.

4. The method of claim 1, further comprising:
providing a fully open position command for the turbocharger wastegate valve via the controller;
if the fluid flow upstream of a compressor of the turbocharger is choked, only temporarily closing the turbocharger wastegate valve to determine the current fully closed position via the controller; and
if the fluid flow upstream of the compressor of the turbocharger is not choked, executing the fully open position command via the controller.

5. The method of claim 1, further comprising:
providing a fully open position command for the turbocharger wastegate valve via the controller;
if the fuel is not being supplied to cylinders of the internal combustion engine, only temporarily closing the turbocharger wastegate valve to determine the current fully closed position via the controller; and
if the fuel is being supplied to the cylinders, executing the fully open position command via the controller.

6. The method of claim 1, further comprising:
associating the current fully closed position with the temperature and the time via the controller; and
storing the current fully closed position and the associated temperature and the associated time in the controller such that learned fully closed positions are accessible for given temperatures;
wherein temporarily closing the turbocharger wastegate valve to determine the current fully closed position is preferentially scheduled for a selected temperature via the controller if a threshold duration since a fully closed position for the selected temperature was determined is exceeded.

7. The method of claim 6, further comprising determining the fully closed position for the selected temperature by extrapolating the learned fully closed positions for temperatures proximate the selected temperature via the controller.

8. The method of claim 1, further comprising:
determining whether the rate of change of desired torque is positive or negative via the controller;

if the rate of change of desired torque is positive and does not exceed a first threshold, only temporarily closing the turbocharger wastegate valve via the controller; and if the rate of change of desired torque is negative and does not exceed a second threshold, only temporarily closing the turbocharger wastegate valve via the controller;

wherein the first threshold is greater than the second threshold.

9. The method of claim 1, wherein the turbocharger wastegate valve is temporarily closed via the controller if an engine revolution rate is below a threshold, otherwise, an actuator is adjusted to move the turbocharger wastegate valve to the non-closed position commanded without temporarily closing the turbocharger wastegate valve via the controller; and wherein the turbocharger wastegate valve is temporarily closed via the controller if an engine load is below a threshold, otherwise the actuator is adjusted to move the turbocharger wastegate valve to the non-closed position commanded based on the determined current fully closed position via the controller.

10. The method of claim 1, wherein the turbocharger wastegate valve is temporarily closed via the controller if a threshold duration since prior determination of the fully closed position is exceeded, otherwise, an actuator is adjusted to move the turbocharger wastegate valve to the non-closed position commanded without temporarily closing the turbocharger wastegate valve via the controller; and wherein the turbocharger wastegate valve is temporarily closed via the controller if a threshold change in temperature is exceeded, otherwise, the actuator is adjusted to move the turbocharger wastegate valve to the non-closed position commanded without temporarily closing the turbocharger wastegate valve via the controller.

11. The method of claim 1, further comprising:

determining a residence time based on a difference between the position command and a current turbocharger wastegate valve lift via the controller; and maintaining the turbocharger wastegate valve at the current fully closed position for at most the residence time via the controller, wherein the determined residence time decreases as the difference between the position command and a current turbocharger wastegate valve lift increases.

12. A turbocharger system in an internal combustion engine comprising:

a turbocharger including a wastegate valve; and a controller including executable instructions stored in non-transitory memory to close the wastegate valve to determine a current fully closed position of the wastegate valve prior to execution of a position command for the wastegate valve if a position command for the waste gate valve corresponds to a first lift region, but not a second lift region, relative to a valve seat; and execute the position command if the position command does not correspond to the first lift region in response to any one of a rate of change of desired torque, an engine revolution rate, an engine load, and a rate of change of desired torque, and a residence time.

13. The turbocharger system of claim 12, wherein the current fully closed position corresponds to an orientation of an actuator operatively coupled to the wastegate valve.

14. The turbocharger system of claim of 13, wherein the actuator is one of a pneumatic actuator and an electric actuator.

15. The turbocharger system of claim 12, further comprising additional instructions to:

determine whether the rate of change of desired torque is positive or negative;

close the wastegate valve if the rate of change of desired torque is positive and does not exceed a first threshold; and close the wastegate valve if the rate of change of desired torque is negative and does not exceed a second threshold;

wherein the first threshold is greater than the second threshold.

16. The turbocharger system of claim 12, further comprising additional instructions to close the wastegate valve is closed if an engine revolution rate, an engine load, and a rate of change of desired torque are below respective thresholds.

17. The turbocharger system of claim 12, further comprising additional instructions to:

determine a residence time based on a difference between the position command and a current wastegate valve lift; and maintain the wastegate valve at the current fully closed position for at most the residence time.

18. A turbocharger system in an internal combustion engine comprising:

a turbocharger including a wastegate actuator and a wastegate valve; and a controller including executable instructions stored in non-transitory memory to adjust the wastegate actuator responsive to a desired and actual wastegate valve position, including temporarily actuating the wastegate valve to a fully closed state when the wastegate valve is commanded to a non-fully closed position greater than a lower threshold but smaller than an upper threshold; and further adjusting the wastegate actuator based on the actual wastegate valve position at the fully closed state.

19. The turbocharger system of claim 18, wherein a duration of a residence time for which the wastegate valve position is temporarily at the fully closed state is based on a rate of change of desired engine torque; and wherein the duration of the residence time decreases as the rate of change increases.

20. The turbocharger system method of claim 18, wherein the controller further comprises additional executable instructions to indicate a wastegate valve degradation based on the actual wastegate valve position at the fully closed state disagreeing with a fully closed position of the wastegate valve by greater than a degradation threshold for greater than a duration of a residence time.

* * * * *